Dec. 11, 1923.                                                                    1,477,270
                              L. LARSEN
                       FLUID CIRCULATING SYSTEM
                        Filed Aug. 2, 1922              2 Sheets-Sheet 1
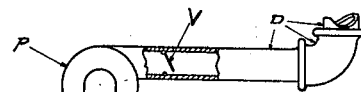
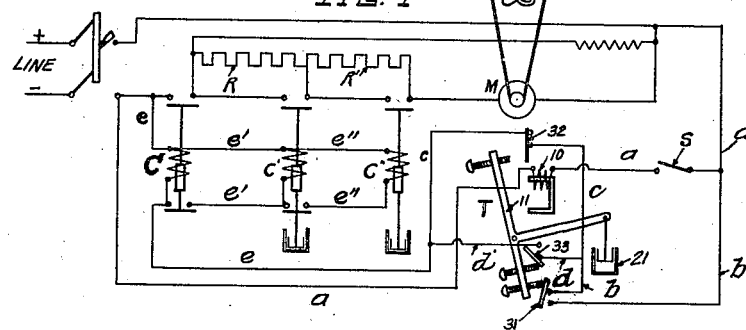
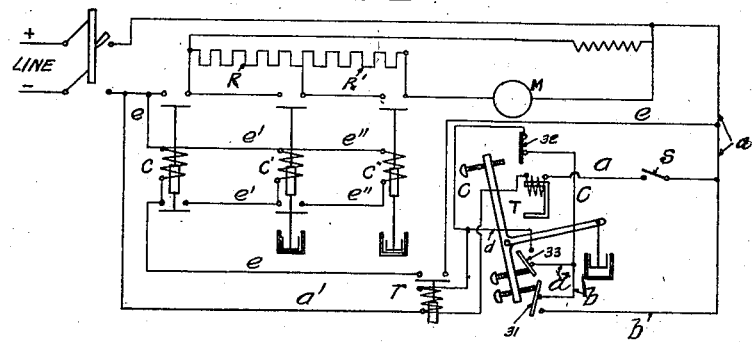
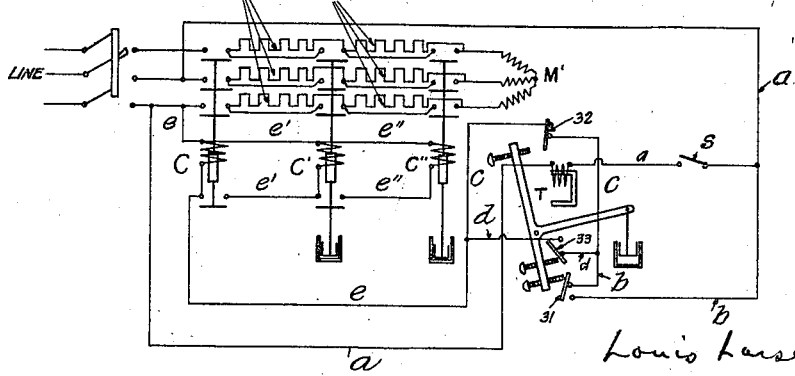
INVENTOR
Louis Larsen
BY
ATTORNEY

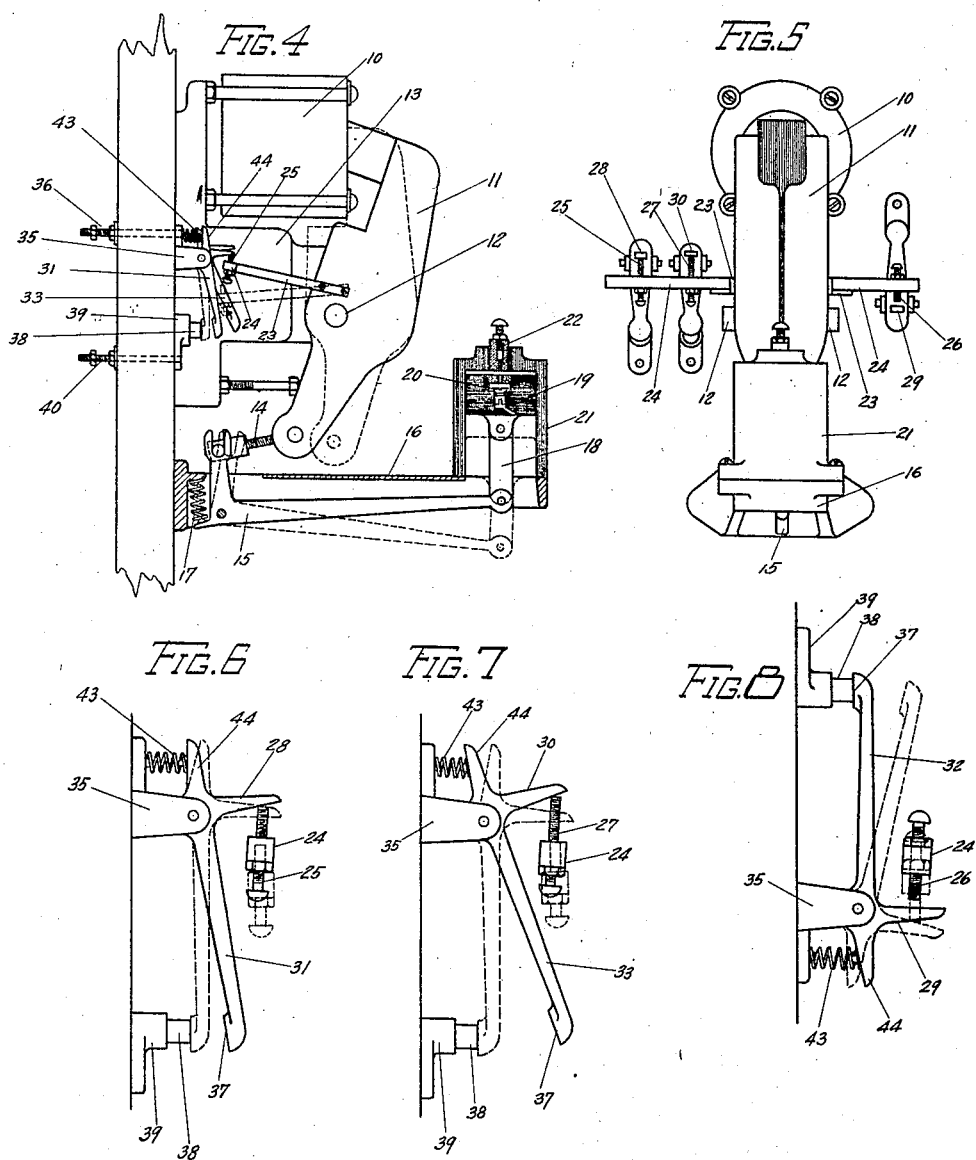

Patented Dec. 11, 1923.

1,477,270

UNITED STATES PATENT OFFICE.

LOUIS LARSEN, OF EAST ORANGE, NEW JERSEY, ASSIGNOR, BY MESNE ASSIGNMENTS, TO SUNDH ELECTRIC COMPANY, OF NEWARK, NEW JERSEY, A CORPORATION OF NEW JERSEY.

FLUID-CIRCULATING SYSTEM.

Application filed August 2, 1922. Serial No. 579,156.

*To all whom it may concern:*

Be it known that I, LOUIS LARSEN, a citizen of the United States, residing at East Orange, in the county of Essex and State of New Jersey, have invented certain new and useful Improvements in Fluid-Circulating Systems, of which the following is a specification.

The present invention relates to a fluid circulating system, specifically a motor-driven pumping installation in which a centrifugal or similar pump, or fan, is employed to effect the circulation of the fluid; and it has for its object the prevention of the hammering of the check valve or valves, ordinarily provided to automatically prevent a reverse flow of the fluid, when the pump or fan is stopped.

In pumping installations, such for example as are used in connection with public and sometimes private water-supply and sewage-disposal plants, where a centrifugal pump is employed to raise large quantities of water or other fluid, the hammering of the check valve whenever the pump is stopped, due to the immediate reduction of the driving pressure which allows suction and the back pressure thereon to slam the check valve down upon its seat, causes great, often intolerable, annoyance and often results in serious damage.

The problem involved has never heretofore been solved. On the contrary, the difficulty has been avoided, merely, by doing away altogether with the simple, automatic and otherwise satisfactory check valve and by using in place thereof some form of slide valve which is either operated manually or, as is frequently the case, is equipped with expensive mechanism for its automatic operation in order to avoid the trouble and inconvenience of having to open and close it by hand.

I have discovered, however, that the hammering of the check valve can be entirely obviated by a simple manipulation of the motor or other engine used to drive the pump, which consists, when shutting down the plant, in slowing down the motor and pump to so reduce the discharge from the pump as to substantially balance the fluid pressure on the opposite sides of the valve, allowing the valve to close by gravity in the quiescent fluid, and then stopping the pump, or, as a modification thereof, in first stopping or slowing down the motor and pump to reduce the pressure against the valve and to allow the back pressure thereon to partially close it, then temporarily restarting the pump to so increase the pressure as to at least check the momentum of the valve shortly before it reaches its seat, and finally stopping the pump before the valve has been reopened and allowing it to seat itself without material shock. The conditions differ more or less in different installations, but the engineer in charge will be able, after a few tests, to determine both the extent and duration of the changes in pressure required in a particular installation to secure the desired result.

The invention also comprises a motor control system, for an electrically driven pump, in which a novel timing relay, adjustable to varying conditions, serves when energized to effect the starting of the motor and the cutting out of the starting resistance in its circuit in the usual manner and when de-energized will effect the opening of the motor circuit and the cutting in of the resistance and then, at predetermined time intervals, first the closing of the motor circuit and the cutting out of a part at least of the resistance and finally the reopening of the motor circuit.

The invention will be understood by reference to the accompanying drawings, in which—

Figure 1 is a view illustrating diagrammatically a pumping installation driven by a direct current or single phase alternating current motor equipped with my new automatic control; Fig. 2, a diagram illustrating a modification of the control system as applied to a direct current or single phase alternating current motor; Fig. 3, a diagram illustrating the application of the control system to a polyphase alternating current motor; Figs. 4 and 5, views illustrating, in side and front elevation respectively, the preferred form of the timing relay shown diagrammatically in the preceding figures; and Figs. 6, 7 and 8, detached views of the three switches of the timing relay, corresponding to Fig. 4 but on an enlarged scale.

The same parts are indicated by the same reference characters throughout the several figures.

Referring first to Fig. 1 of the drawings, P indicates the pump of a pumping installation, and D the pipe or conduit which is connected with the discharge side of the pump and which is provided with the check valve V. The pump is driven by the motor M, a shunt motor as here shown, which is operatively connected thereto in any suitable manner. The control system of the motor comprises the two sections of starting resistance R R', the contactors C C' C'' which control the motor circuit and the resistance, the timing relay T, and the actuating circuit connections $a$, which with a pilot switch $s$ therein controls the timing relay, and $b$ $c$ $d$ $e$ $e'$ and $e''$, which are controlled by the timing relay and in turn control the contactors. The timing relay consists, essentially, of a magnet coil 10, an armature 11 which when the magnet coil is energized is instantaneously drawn therein or thereto and when the magnet coil is de-energized will fall back or move therefrom under the control of the dash-pot 21, and of three switch members 31 32 and 33, each controlling a set of contacts in one of the actuating circuits, which are so operatively connected with the armature that, when the magnet coil is energized, two of the switches, 31 and 33 as shown, will be held in open position and the remaining switch 32 will be held in closed position and, when the magnet coil is de-energized and as the armature falls away therefrom, one of the closed switches, 33 as shown, will first be moved to open position, then the open switch 32 will be moved to closed position, and finally the other open switch 31 will be moved to open position, in which positions the switches will be held until the magnet coil is again energized.

The operation of the control system in the starting and stopping of the motor and pump is as follows: The line switch being closed, on the closing of the pilot switch $s$ current flows from the positive to the negative main over the wire $a$, thus energizing the magnet coil 10 of the timing relay which attracts the armature 11 and thereby effects first the closing of the contacts controlled by the switch member 31, then the opening of the contacts controlled by the switch member 32, and finally the closing of the contacts controlled by the switch member 33, but in such rapid succession that the circuit completed by the closure of the switch member 31 does not have time to actuate the contactors before it is broken by the opening of the switch member 32. Thereupon current flows from the positive main over a portion of the wire $a$, the wire $b$ and switch 31, the wire $d$ and switch 33, and the wire $e$ through the coil of the contactor C to the negative main, actuating the contactor C which in turn closes the actuating circuit $e'$ of the next contactor C', and so on, and thereby effecting the closing of the motor circuit and the cutting out of the sections of resistance in the usual manner. To close down the plant, the pilot switch $s$ is opened, breaking the circuit of the wire $a$ and de-energizing the coil of the timing relay. Thereupon, as the armature slowly falls back under the control of the dash-pot, the connection of the actuating circuit wire $e$ with the positive main is first broken at the contacts controlled by the switch member 33, thus de-energizing the coils of all three contactors and thereby stopping the motor, is then after a time interval again established by the bridging of the contacts controlled by the switch member 32, thereby causing the actuation of the contactor C and restarting the motor, and finally after another time interval is broken at the contacts controlled by the switch member 31. By the adjustments provided, in the connections between the armature and the switch members and in the dash-pot, the operation of the timing device can, after a few trials, be so regulated that the pump, after its stopping has allowed the check valve to partially close, will be restarted in time to check the momentum of the valve before it reaches its seat but will not be kept running long enough to reopen the valve. For example, in one specific installation it has been found that adjustments of the timing device by which are secured time intervals of one second between the opening of the contacts controlled by the switch arm 33 and the closing of the contacts controlled by the switch arm 32 and of five seconds between the closing of the latter contacts and the opening of the contacts controlled by the switch arm 31 will assure an easy noiseless closing of the check valve.

In the modification of the control system illustrated in Fig. 2, a relay $r$ is added for the control of the actuating circuit wire $e$ which is connected back to the positive main, and the timing relay, which in the control system of Fig. 1 directly controls the connections of this wire with the positive main, here controls the circuit through the coil of the relay and thereby indirectly the connection of the actuating circuit wire $e$ with the positive main. The operation of the device, which is obvious, is substantially the same as before, but the employment of the relay reduces the amount of current carried by the contacts of the timing relay and so permits the use of smaller contacts.

The control system illustrated in Fig. 3 differs from that shown in Fig. 1 only in the fact that the contactors, which are controlled by the timing relay, are adapted and used for the control of the three wires, and of sections of resistance in the three wires, of the primary M' of a polyphase alternating current motor.

Referring now to Figs. 4–8 of the drawings, the electromagnet of the timing device, of the so-called clapper type, has its coil 10 mounted upon the base, and its armature 11 pivoted at 12 in the sides, of a standard 13 which is secured in any suitable manner to the usual slate panel. The lower end of the armature is adjustably connected, by a threaded rod 14 pivoted therein, to the inner short arm of an elbow-lever 15, which in turn is pivoted to a standard 16 mounted on the panel. The outer end of the long arm of this lever is connected by the link 18 to the piston 19 of the dash-pot 21, mounted upon the outer end of the standard 16, and a spring 17, interposed between the base of the standard and a lug on the lever, serves to counterbalance the weight of the piston. The dash-pot piston is provided with the usual valve-controlled by-pass 20, the valve being arranged to allow the free downward movement of the piston within the cylinder and to retard its upward movement, and an adjustable air vent 22 is also provided in the head of the cylinder. Secured to the opposite sides of the armature are two rods 23 which at their lower ends carry bars 24, of insulating material, which in turn carry, adjustably mounted in threaded openings therein, three screw rods 25 26 27 in operative relation with lugs 28 29 and 30 projecting respectively from the backs of the switch members 31 32 and 33. Each of the three switch members, which are substantially alike, is pivotally mounted in a bracket 35 secured to the panel in electrical connection with a binding post 36 at the back thereof, carries at its outer end a contact 37, co-operating with a fixed contact 38 carried in a socket 39 secured to the panel in electrical connection with a binding post 40, and is normally biased to closed position by a spring 43 interposed between the base of the bracket and the tail 44 of the switch member. It will be noted that the switch members 31 and 33 are so placed that the actuating rods 25 and 27 will be pressed against the lugs 29 and 30, opening their contacts and compressing the springs 43, whenever the magnet coil is de-energized and the armature falls away therefrom but will be withdrawn so as to allow the springs to close the switch contacts when the magnet coil is de-energized and attracts the armature, while the position of the switch member 32 is reversed so that its actuation is just the opposite of that of the others. By properly adjusting the length of the switch actuated rods, the connection between the armature and the dash-pot piston, and the size of the vent in the cylinder of the dashpot, the timing device can be adapted to use under widely varying conditions.

What I claim as new, and desire to secure by Letters Patent, is—

1. In a fluid circulating system provided with a check valve, the method of stopping the circulation of the fluid which comprises an adjustment of the pressure of the fluid against the valve which will assure the closing of the valve without substantial shock.

2. In a fluid circulating system provided with a check valve, the method of stopping the circulation of the fluid comprising an adjustment of the pressure of the fluid against the check valve which allows the valve to partially close and then checks the momentum of the valve before it reaches its seat, and finally permits it to seat itself before it has been reopened.

3. In a fluid circulating system provided with a check valve, the combination with means for creating a pressure of fluid which will effect the desired circulation thereof and thereby open the valve of means for controlling said pressure creating means whereby to secure an adjustment of the fluid pressure which will assure the closing of the valve without substantial shock.

4. In a fluid circulating system provided with a check valve, the combination with means for creating a pressure of fluid which will effect the desired circulation thereof and thereby open the valve of control means operative automatically to secure, when stopping the circulation of the fluid, an adjustment of the fluid pressure which will assure the closing of the valve without substantial shock.

5. In a fluid circulating system provided with a check valve, the combination with means for creating a pressure of fluid which will effect the desired circulation thereof and thereby open the valve of means for controlling said pressure creating means adapted to secure adjustments of the pressure which will allow the valve to be partially closed, will then check the momentum of the valve before it reaches its seat, and will finally allow the valve to be seated before it has been reopened.

6. In a fluid circulating system, the combination of a conduit, fluid pressure supply means for causing the circulation of the fluid through the conduit, a check valve in said conduit adapted to prevent a reverse flow of the fluid, and control means operative to effect an adjustment of the fluid pressure which will permit the closing of the valve without substantial shock.

7. In a fluid circulating system, the combination of a conduit, fluid pressure supply means for causing the circulation of the fluid through the conduit, a check valve in said conduit adapted to prevent a reverse flow of the fluid, control means for said fluid pressure supply means operative to effect a reduction and then at determinate time intervals thereafter first an increase and then a reduction of the fluid pressure.

8. In a pumping installation, the combination of a pump, means for driving the pump, a fluid circulating conduit attached to the discharge side of the pump and provided with a check valve, and control means for the pump driving means operative to effect a reduction of the fluid pressure against the check valve to allow the valve to be partially closed and then automatically to effect first an increase of such fluid pressure to check the momentum of the valve before it reaches its seat and then a reduction thereof before the valve has been reopened.

9. In a pumping installation, the combination of a centrifugal pump, means for driving the pump, a fluid circulating conduit connected with the discharge side of the pump and provided with a check valve, and means for preventing the hammering of the check valve when the installation is shut down comprising control means operative to so control the speed of the pump as to effect an adjustment of the fluid pressure against the valve which will assure its closing without substantial shock.

10. In a pumping installation, the combination of a centrifugal pump, means for driving the pump, a fluid circulating conduit connected with the discharge side of the pump and provided with a check valve, and means for preventing the hammering of the check valve when the installation is shut down comprising control means operative to effect first a slowing down of the pump to allow the check valve to be partially closed and then a speeding up of the pump to check the momentum of the valve before it reaches its seat and finally the stopping of the pump before the valve has reopened.

11. In a motor-driven pumping installation, the combination with a centrifugal pump and a motor therefor of control means for the motor adapted to first stop and then at determined time intervals thereafter automatically to start and finally to again stop the pump.

12. In an electrically driven pumping installation, the combination with a motor and motor circuit of means for closing the motor circuit to start the motor and means for stopping the motor operative to first open the motor circuit and then automatically at determinate time intervals to close and again open the motor circuit.

13. In an electrically driven pumping installation, the combination with a motor and motor circuit of electromagnetically actuated means operative when energized to effect the closing of the motor circuit and when de-energized to effect first the opening and then the closing and finally the reopening of the motor circuit.

14. In combination, a motor, circuit connections therefor, means for closing the motor circuit to start the motor, and means for stopping the motor operative first to open and then automatically and at determinate time intervals to close and to again open the motor circuit.

15. In combination, a motor, a circuit therefor, electromagnetically actuated means operative when energized to effect the closing of the motor circuit and when de-energized to automatically effect first the opening then the closing and finally the reopening of the motor circuit.

16. In combination, a motor, a circuit therefor, resistance in the motor circuit, and a control system comprising an electromagnetically actuated means operative when energized to effect the closing of the motor circuit and the cutting out of the resistance and when de-energized to effect first the opening of the motor circuit and the cutting in of the resistance and then at determinate time intervals thereafter the closing of the motor circuit and the cutting out of at least a part of the resistance and the reopening of the motor circuit.

17. In a motor control system, the combination with a motor and its circuit, of a contactor controlling the motor circuit, an actuating circuit for the contactor, electromagnetic means operative when energized to effect the closing of the contactor actuating circuit and when de-energized to effect first the opening then after a determinate time interval the closing and finally after a further determinate time interval the reopening of the contactor actuating circuit.

18. In a motor control system, the combination with a motor and a starting resistance in the circuit thereof of a plurality of contactors controlling the motor circuit and the resistance and automatic control means whereby the contactors are successively actuated to start the motor and when stopping the motor are first released and then one at least thereof is again actuated and again released.

19. In a motor control system, the combination with a motor and starting resistance in the circuit thereof of a plurality of contactors controlling the motor circuit and the resistance, actuating circuit connections whereby the contactors are actuated successively and are released, and automatic control means whereby in starting the motor the said actuating circuit is closed and in stopping the motor the said actuating circuit is first opened, then after a time interval is closed and finally after another time interval is reopened.

20. In a motor control system, the combination with a motor having a starting resistance in its circuit of a plurality of contactors controlling each a section of the resistance, actuating circuits for the contactors whereby the actuation of one effects the actuation of the next contactor and the release of one effects the release of all contactors, and an electromagnetically controlled relay operative when energized to effect the closing, and when de-energized to effect first the opening and then at a determinable time interval thereafter the closing and the reopening, of the actuating circuit of the first contactor.

LOUIS LARSEN.